United States Patent Office 3,350,435
Patented Oct. 31, 1967

3,350,435
ORGANO-ARSENIC-NITROGEN COMPOUNDS AND THE PREPARATION THEREOF
John R. Van Wazer, Ladue, and Kurt Moedritzer, Webster Groves, Mo., and Marvin D. Rausch, Amherst, Mass., assignors to Monsanto Company, St. Louis, Mo., a corporation of Delaware
No Drawing. Filed Dec. 30, 1964, Ser. No. 422,429
12 Claims. (Cl. 260—440)

The present invention relates to novel substituted arsenic nitrogen nitrogen compounds. It is an object of the invention to prepare certain novel compounds containing arsenic and nitrogen and existing in polymeric form.

It is also an object of the invention to provide certain arsenic nitrogen compounds having biological activity, for example, as insecticides, fungicides and herbicides.

The compounds contemplated in the present invention have the general over-all composition $$[As[(NQ)_{1/2}]_xX_y]_m$$

where $x$ and $y$ are positive numbers, $m$ is an integer from 2 to 1000 and $x+y=3$. In the above formula Q is a hydrocarbyl radical of from 1 to 20 carbon atoms including alkyl, cycloalkyl and aromatic radicals (6–20 carbon atoms); X is selected from the group consisting of halogens such as fluorine, chlorine, bromine and iodine, alkoxy radicals, OR; dialkyl amine radicals, $NR_2$; and mercapto radicals, SR; were R is an alkyl radical having from 1 to 20 carbon atoms.

The general method for the preparation of the present compounds is by the reaction of an arsenic compound $AsX_3$, wherein X is defined above, in an inert solvent, together with an arsenic cage compound such as

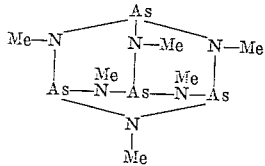

which latter starting material is readily made by adding arsenic trichloride to methylamine or the corresponding $H_2NQ$ compound, wherein Q has the meaning set forth above.

The mole ratio between the starting components e.g., the arsenic cage compound and the modifying arsenic compound, $AsX_3$ set forth above, is broadly in the proportion of from 100:1 to 1:100, with a preferred range being 0.1 to 15 molar proportions of the $AsX_3$ compound relative to the arsenic cage compound.

The general classes of specific products obtained in the practice of the present invention, and falling within the above general formula, with the central (NMe) or more generally, the NQ radical existing, as a linear or chain structure are as follows:

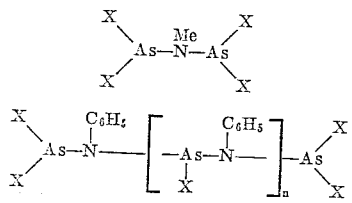

and as a representative of a branched structure (Pr indicates the propyl group)

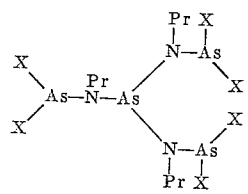

Representative ring compounds of the invention are:

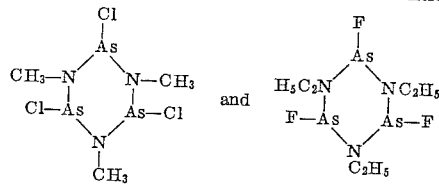

The general procedure for the preparation of the present compounds is to agitate together the respective components, for example the compound

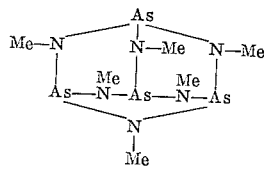

together with arsenic trichloride or other $AsX_3$ compound defined above in the desired proportion, for example 1:8 moles, and with the mixture at a temperature in the range of from $-50°$ C. to $150°$ C. A solvent is not necessary, although it is more convenient to operate in the presence of a hydrocarbon solvent e.g., pentane, benzene, toluene or decane solvent or a halogenated solvent such as carbon tetrachloride. The pressure may be maintained at the desired level for vacuum or pressure conditions, using a suitable vessel such as a flask, autoclave, or a sealed tube under an inert gas atmosphere for example nitrogen or argon. The general method is as follows: the product distribution is controlled by using more than 2 proportions such as 2.1 to 15 moles of $AsX_3$ per mole of arsenic cage compound for the obtainment of predominantly linear polymers, and 2 or less (e.g. 0.1 to 2) moles for predominantly ring type products. The reactants are charged to a flask, or are accurately weighed into 5 mm. I.D. thick-walled Pyrex tubes which are previously kept in an oven to remove sorbed water and are then flushed with pure, dry nitrogen. The tubes are sealed and then heated for 8 hrs. at 130° C. The contents of each tube are completely homogeneous under these conditions. After heating, the tubes are rapidly cooled at 0° C. The solid phase which crystallizes out can be centrifuged from the reaction mixture, thereby obtaining a partial separation of reaction products.

The sealed tubes are then opened and are carefully warmed until the contents are homogeneous. A portion of the contents are transferred directly into a precision-bore, thin-walled tube, using an adequate hood, and avoiding contact with the operator's skin. The samples are investigated by proton nuclear magnetic resonance (for Q being methyl groups). The remaining material is dissolved in three parts of toluene and the resulting solution transferred into another NMR tube and also investigated under such dilute conditions favoring higher resolutions by proton nuclear magnetic resonance. The NMR data for the full course of the reaction shows that the system very rapidly attains equilibrium, e.g., upon dissolution of the cage compound $As_4(NCH_3)_6$ or other hydrocarbyl substituted compound.

The following examples illustrate specific embodiments of the present invention.

Example 1

A quantity of 4.74 g. of $As_4(NCH_3)_6$ is combined with 2.64 g. of arsenic trifluoride (1:2 molar ratio) in a sealed reaction tube and heated for several hours at 120° C. The resulting reaction product is a viscous oil of the overall composition $As(NCH_3)F$ being composed predominantly of ring structures and containing an equilibrium mixture of various $NCH_3$ bridged arsenic fluorides. Thus in the general formula $[As[(NQ)_{1/2}]_xX_y]_m$ where Q is methyl, X is fluorine, $x$ is 2, $y$ is 1 and $m$ is either 3 or 4. Separation of the 3-arsenic atom rings from the reaction mixture is effectuated by chromatographic adsorption on alumina, or by fractional crystallization at −78° C. from pentane.

Example 2

A quantity of 4.74 g. of $As_4(NCH_3)_6$ is heated with 1.32 g. of arsenic trifluoride (1:1 molar) dissolved in 5 cc. of toluene and heated at 60° C. for 2 hours. The reaction mixture having the overall polymeric composition, $As(NCH_3)_{1.2}F_{0.6}$ consists of a viscous liquid having a molecular structure predominantly composed of branched rings.

Example 3

An amount of 4.74 g. of $As_4(NCH_3)_6$ is reacted with 12.65 g. of arsenic trichloride in a reaction flask at 75° C. The resulting polymeric product has an overall composition of $As(NCH_3)_{0.55}Cl_{1.9}$ and consists mainly of the species $Cl_2AsN(CH_3)AsCl_2$.

Example 4

A quantity of 5.58 g. of $As_4(NCH_2)_6$ is mixed with 12.6 g. of arsenic tribromide and heated at 120° for 1 hour. The resulting polymeric viscous reaction product has the overall composition $As(NCH_3)_{0.75}Br_{1.5}$.

Example 5

A 4.74 g. sample of $As_4(NCH_3)_6$ is heated together with 22.8 g. of arsenic triiodide in a hydrocarbon solvent. After removal of the solvent the polymeric residue shows the overall composition $As(NCH_3)_{0.67}I_{1.67}$.

Example 6

A quantity of 4.74 g. of $As_4(NCH_3)_6$ is combined with 2.52 g. of trimethylarsenite, $As(OCH_3)_3$, in a reaction tube and heated for several hours at 130° C. The resulting reaction mixture is a polymeric viscous liquid with the overall composition $As(NCH_2)_{1.09}(OCH_3)_{0.82}$.

Example 7

An amount of 8.48 g. of $As_4(NC_6H_5)_6$ is mixed with 12.42 g. of trisdimethylaminoarsine, $As[N(CH_3)_2]_3$, and heated at 100° C. over a period of 10 hours. The resulting polymeric reaction product has the general formula $As(NC_6H_5)_{0.6}(N(CH_3)_2)_{1.8}$, or $As_5(NC_6H_5)_3[N(CH_3)_2]_9$ as the smallest compound corresponding to the said composition. The polymeric forms of the present compounds, e.g., having from 2 to 1000 arsenic atoms per molecule are obtained using the higher range of proportions of the cage compound $As_4(NC_6H_5)_6$ relative to the $As[N(CH_3)_2]_3$ within the broad range of 100:1 to 1:100.

Example 8

An amount of 4.72 g. of the cage compound $As_4(NCH_3)_6$ is combined with 14.5 g. of arsenic trichloride (8:1 molar relative to the cage compound or generally 8:1 to 2:1) and heated for 2 hours at 75° C. The resulting polymeric liquid has the overall composition $Cl_2As[N(CH_3)]_{0.5}$ and consists of 78%

$$Cl_2AsN(CH_3)AsCl_2$$

(bis(dichloroarsenous)methylimine) as evidenced by the proton nuclear magnetic resonance at −2.90 p.p.m. and of 22% of higher molecular chains (chiefly based on 3 and 4 arsenic atoms per chain) as evidenced by the proton nuclear magnetic resonance seen at −2.83 p.p.m. for middle group configurations of the type

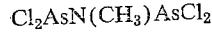

in chains of various chain lengths, so that the general formula is $Cl_2As[NCH_3—AsCl]_nNCH_3—AsCl_2$, predominantly $n=0$ to $n=4$. A fractional crystallization of the product mixture in pentane is used to obtain the individual polymer species, with the dimer, containing two arsenic atoms shown above as the major product; however the 3, 4 and 5 arsenic atom compounds are also present in the crude reaction mixture.

Example 9

A quantity of 4.72 g. of $As_4(NCH_3)_6$ is added to 10.55 g. of arsenic trifluoride (8 molar relative to cage compound) and heated for 30 minutes at 50° C. The resulting reaction product is a liquid having the overall composition $AsF_2(NCH_3)_{0.50}$. Proton nuclear magnetic resonance shows that this material consists of ca. 80% $F_2AsN(CH_3)AsF_2$(bis(difluoroarsenous)methylimine) as shown by the signal at −2.78 p.p.m. and of ca. 20% higher chain polymers of the type

as evidenced by the signals at −2.73 p.p.m. attributable to the compound with $n=1$, and the signals at −2.91, −2.80 p.p.m. attributable to compounds with $n>1$ (chiefly $n=2$ and $n=3$). Fractional crystallization from pentane at −78° C. is used to isolate the major dimeric product containing two As atoms although the 3, 4 and 5 arsenic atom compounds are also present. The ratios of the products can be regulated by operating within the preferred range of 8:1 to 2:1 of $AsX_3$ to cage compound.

Example 10

A quantity of 4.74 g. of $As_4(NCH_3)_6$ is mixed with 3.62 g. of arsenic trichloride (2:1 molar proportion relative to the cage compound) and heated for 10 hours at 100° C. resulting in an oily viscous liquid of the overall-composition $As(NCH_3)Cl$. Proton nuclear magnetic resonance of a toluene solution of this material shows that it consists of ca. 85% of a trimeric ring compound $(ClAsNCH_3)_3$ (chloromethyliminoarsine trimer) evidenced by the signal at −2.80 p.p.m. and of ca. 15% of other polymer species based on arsenic, chlorine, and methylimino groups. The remaining minor components $(ClAsNCH_3)_n$ where $n$ is 4 or 5, and condensed rings containing branches are also found.

The compounds of the present invention have utility as biological compounds such as insecticides, fungicides and herbicides, as well as in the eradication of vermin, such as rats. The table below shows certain of these compounds and typical biological activity. The herbicidal data is reported on the scale of 0—no phytotoxicity to 4—complete kill.

HERBICIDE GROUP

Bis(dichloroarsenous)methylimine (and minor proportions of higher oligomers)—

| Seed: | Pre-emergent 25 lbs./acre |
|---|---|
| Broadleaf | 3 |
| Morning glory | 3 |
| Rye grass | 1 |

| Seed: | Pre-emergent 25 lbs./acre |
|---|---|
| Radish | 2 |
| Sugar beets | 3 |
| Pigweed | 3 |
| Soybean | 3 |
| Wild buckwheat | 1 |
| Tomato | 2 |

Bis(dichloroarsenous)methylimine (and minor proportions of higher oligomers)—

| Seed: | Contact 0.5% |
|---|---|
| Grass | 3 |
| Broadleaf | 3 |
| Morning glory | 4 |
| Wild oat | 3 |
| Brome grass | 3 |
| Rye grass | 3 |
| Radish | 4 |
| Sugar beets | 4 |
| Foxtail | 4 |
| Crab grass | 4 |
| Pigweed | 4 |
| Wild buckwheat | 4 |
| Tomato | 4 |
| Sorghum | 2 |

Chloromethyliminoarsine (trimer with minor porportions of binary and higher polymers)—

| Seed: | Contact 0.5% |
|---|---|
| Grass | 3 |
| Broadleaf | 3 |
| Morning glory | 4 |
| Wild oat | 3 |
| Brome grass | 3 |
| Rye grass | 2 |
| Radish | 4 |
| Sugar beets | 4 |
| Foxtail | 4 |
| Crab grass | 4 |
| Wild buckwheat | 4 |
| Tomato | 4 |
| Sorghum | 3 |

Bis(difluoroarsenous)methylimine (and minor proportions of higher oligomers)—

| Seed: | Contact 0.5% |
|---|---|
| Grass | 2 |
| Broadleaf | 3 |
| Morning glory | 4 |
| Wild oat | 2 |
| Brome grass | 2 |
| Rye grass | 2 |
| Radish | 2 |
| Sugar beets | 4 |
| Foxtail | 4 |
| Crab grass | 4 |
| Wild buckwheat | 4 |
| Tomato | 4 |
| Sorghum | 2 |

Fluoromethyliminoarsine (trimer with minor proportion of binary and higher polymers)—

| Seed: | Contact 0.5% |
|---|---|
| Grass | 1 |
| Broadleaf | 3 |
| Morning glory | 3 |
| Wild oat | 1 |
| Brome grass | 1 |
| Rye grass | 2 |
| Radish | 4 |
| Sugar beets | 3 |
| Foxtail | 2 |
| Crab grass | 3 |
| Pigweed | 4 |

| Seed: | Contact 0.5% |
|---|---|
| Soybean | 4 |
| Wild buckwheat | 2 |
| Tomato | 4 |
| Sorghum | 1 |

Fluoromethyliminoarsine (trimer with minor proportion of binary and higher polymers)—

| Seed: | Pre-emergent 25 lbs./acre |
|---|---|
| Sugar beets | 2 |
| Pigweed | 3 |

FUNGICIDE GROUP

Fluoromethyliminoarsine (trimer with minor proportion of binary and higher polymers)—

| | |
|---|---|
| Phytothphor | 3 |
| Tomato | 4 |

The fugicide rating scale is from 1—no injury to 5—complete kill at 300 p.p.m. concentration.

The compositions of the present invention may be applied to a variety of plants to control or inhibit their growth. They may be applied to an area containing a crop, for example a bean or cotton crop to inhibit the growth of weeds thereon or they may be used to keep an area free from all plant growth.

While the herbicidal and fungicidal compositions may be applied to plants as such, e.g. when the plants are affected by a fungal growth, they are preferably used in combination with a carrier. The compositions may be mixed with or deposited upon an inert finely-divided solid such as talc and employed as dusts. Such mixture may also be dispersed in water with or without the aid of a wetting agent and the resulting aqueous suspensions employed as sprays. Alternatively, these products may be used as the active herbicidal constituents in ketone, ether, alcohol, or hydrocarbon solutions, in oil-in-water emulsions or in aqueous dispersions. The concentration of the herbicidal or fungicidal active component may vary widely and depends upon a number of factors, the most important of which are the amount of the composition to be applied per unit of area and the type or types of plants being treated. In addition to the use of phytotoxic amounts of single components, mixtures of two or more of these compositions may be used; if desired, other herbicidal or fungicidal compounds may also be present in the working compositions as applied in the field. In general the proportion of a carrier is such that the active compound is present at from 0.001% to 10% by weight of the total composition.

What is claimed is:

1. Arsenic compounds having the formula $$[As[(NQ)_{1/2}]_xX_y]_m$$

where $x$ and $y$ are positive numbers, $m$ is an integer from 2 to 1000, and $x+y=3$, Q is a hydrocarbyl radical of from 1 to 20 carbon atoms, X is selected from the group consisting of fluorine, chlorine, bromine and iodine; alkoxy radicals, OR; dialkyl amine radicals, $NR_2$; and mercapto radicals, SR; where R is an alkyl radical having from 1 to 20 carbon atoms.

2. A composition having the formula $$Cl_2As[-NCH_3-AsCl-]_nNCH_3-AsCl_2$$

where $n$ is an integer from 0 to 4.

3. The composition having the formula $$F_2As-[-NCH_3-AsF-]_nNCH_3-AsF_2$$

where $n$ is an integer from 0 to 4.

4. The composition having the formula $(ClAsNCH_3)_3$.
5. The composition having the formula $(FAsNCH_3)_3$.
6. Process for the preparation of compounds having the formula $$[As[(NQ)_{1/2}]_xX_y]_m$$

where $x$ and $y$ are positive numbers, $m$ is an integer from 2 to 1000, and $x+y=3$, Q is a hydrocarbyl radical of from 1 to 20 carbon atoms, X is selected from the group consisting of fluorine, chlorine, bromine and iodine; alkoxy radicals, OR; dialkyl amine radicals, $NR_2$; and mercapto radicals, SR; where R is an alkyl radical having from 1 to 20 carbon atoms, which comprises agitating together an arsenic compound having the formula

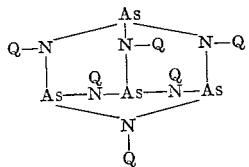

together with $AsX_3$ where X has the designation set forth above, at a temperature of from $-50°$ C. to $150°$ C., and thereafter separating the $[As[(NQ)_{1/2}]_xX_y]_m$.

7. Process for the preparation of compounds having the formula $Cl_2As[-NCH_3-AsCl-]_nNCH_3-AsCl_2$ where $n$ is an integer from 0 to 4, which comprises agitating together the cage compound $As_4(NCH_3)_6$ with approximately a 2 to 8 molar proportion of $AsCl_3$ at a temperature of from $-50°$ C. to $150°$ C., and thereafter separating the product.

8. Process for the preparation of compounds having the formula $$F_2As-[-NCH_3-AsF]_nNCH_3-AsF_2$$

where $n$ is an integer from 0 to 4, which comprises agitating together the cage compound $As_4(NCH_3)_6$ with approximately a 2 to 8 molar proportion of $AsF_3$ at a temperature of from $-50°$ C. to $150°$ C., and thereafter separating the product.

9. Process for the preparation of compounds having the formula $$(ClAsNCH_3)_3$$

which comprises agitating together the cage compound $As_4(NCH_3)_6$ with approximately a 2 molar proportion of $AsCl_3$ at a temperature of from $-50°$ C. to $150°$ C., and thereafter separating the product.

10. Process for the preparation of the compounds having the formula $$(FAsNCH_3)_3$$

which comprises agitating together the cage compound $As_4(NCH_3)_6$ with approximately a 2 molar proportion of $AsF_3$ at a temperature from $-50°$ C. to $150°$ C. and thereafter separating the product.

11. Process for the preparation of compounds having the general formula $$Cl_2As-(NCH_3)AsCl_2$$

which comprises agitating together the cage compound $As_4(NCH_3)_6$ with about 8 molar proportions of $AsCl_3$ at a temperature of $-50°$ C. to $150°$ C. and thereafter separating the product.

12. Process for the preparation of compounds having the general formula $$F_2As-(NCH_3)AsF_2$$

which comprises agitating together the cage compound $As_4(NCH_3)_6$ with about 8 molar proportions of $AsF_3$ at a temperature of $-50°$ C. to $150°$ C. and thereafter separating the product.

No reference cited.

TOBIAS E. LEVOW, *Primary Examiner.*

W. F. W. BELLAMY, *Assistant Examiner.*